US012676253B2

(12) United States Patent
Nomura et al.

(10) Patent No.: US 12,676,253 B2
(45) **Date of Patent: *Jul. 7, 2026**

(54) ANISOTROPIC RARE EARTH SINTERED MAGNET AND METHOD FOR PRODUCING SAME

(71) Applicant: SHIN-ETSU CHEMICAL CO., LTD., Tokyo (JP)

(72) Inventors: Tadao Nomura, Fukui (JP); Kazuki Otsuka, Echizen (JP); Masayuki Kamata, Tsuruga (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 764 days.

This patent is subject to a terminal disclaimer.

(21) Appl. No.: 17/906,999

(22) PCT Filed: Mar. 18, 2021

(86) PCT No.: PCT/JP2021/011008

§ 371 (c)(1),
(2) Date: Sep. 22, 2022

(87) PCT Pub. No.: WO2021/193334

PCT Pub. Date: Sep. 30, 2021

(65) Prior Publication Data

US 2023/0343496 A1 Oct. 26, 2023

(30) Foreign Application Priority Data

Mar. 26, 2020 (JP) ................................ 2020-055766

(51) Int. Cl.

| | |
|---|---|
| ***H01F 1/055*** | (2006.01) |
| ***B22F 3/16*** | (2006.01) |
| ***B22F 3/24*** | (2006.01) |
| ***B22F 9/04*** | (2006.01) |
| ***C22C 38/00*** | (2006.01) |
| ***C22C 38/02*** | (2006.01) |
| ***C22C 38/06*** | (2006.01) |
| ***C22C 38/08*** | (2006.01) |
| ***C22C 38/10*** | (2006.01) |
| ***C22C 38/12*** | (2006.01) |
| ***C22C 38/14*** | (2006.01) |
| ***C22C 38/20*** | (2006.01) |
| ***C22C 38/22*** | (2006.01) |
| ***C22C 38/26*** | (2006.01) |
| ***C22C 38/30*** | (2006.01) |
| ***C22C 38/34*** | (2006.01) |
| ***H01F 41/02*** | (2006.01) |

(52) U.S. Cl.

CPC .............. *H01F 1/0557* (2013.01); *B22F 3/16* (2013.01); *B22F 3/24* (2013.01); *B22F 9/04* (2013.01); *C22C 38/005* (2013.01); *C22C 38/02* (2013.01); *C22C 38/06* (2013.01); *C22C 38/08* (2013.01); *C22C 38/10* (2013.01); *C22C 38/12* (2013.01); *C22C 38/14* (2013.01); *C22C 38/20* (2013.01); *C22C 38/22* (2013.01); *C22C 38/26* (2013.01); *C22C 38/30* (2013.01); *C22C 38/34* (2013.01); *H01F 41/0266* (2013.01); *B22F 2003/248* (2013.01); *B22F 2202/05* (2013.01); *B22F 2301/355* (2013.01); *B22F 2998/10* (2013.01); *B22F 2999/00* (2013.01)

(58) Field of Classification Search

None

See application file for complete search history.

(56) References Cited

U.S. PATENT DOCUMENTS

| | | | | |
|---|---|---|---|---|
| 2014/0290803 | A1* | 10/2014 | Kato ..................... | H01F 1/0577 420/83 |
| 2017/0178772 | A1* | 6/2017 | Sakuma .................. | H01F 1/053 |
| 2019/0189314 | A1 | 6/2019 | Sanada et al. | |
| 2021/0043344 | A1* | 2/2021 | Tomita ...................... | B22F 3/00 |

(Continued)

FOREIGN PATENT DOCUMENTS

| | | | | |
|---|---|---|---|---|
| JP | 04322406 A | * 11/1992 | ............. | H01F 1/055 |
| JP | 06231920 A | * 8/1994 | ............. | H01F 1/058 |
| JP | 2001-189206 A | 7/2001 | | |

(Continued)

OTHER PUBLICATIONS

Reconsideration Report by Examiner before Appeal issued Dec. 5, 2023 in Japanese Patent Application No. 2022-510029, 8 pages.
International Search Report issued Jun. 8, 2021 in PCT/JP2021/011008 filed on Mar. 18, 2021, 3 pages.

*Primary Examiner* — Jenny R Wu

(74) *Attorney, Agent, or Firm* — Oblon, McClelland, Maier & Neustadt, L.L.P.

(57) ABSTRACT

An anisotropic rare earth sintered magnet represented by the formula $(R_{1-a}Zr_a)_x(Fe_{1-b}CO_b)_{100-x-y}(M^1_{1-c}M^2_c)_y$. R is Sm and at least one element selected from rare earth elements, $M^1$ is at least one element selected from the group consisting of V, Cr, Mn, Ni, Cu, Zn, Ga, Al, and Si, $M^2$ is at least one element selected from the group consisting of Ti, Nb, Mo, Hf, Ta, and W, and x, y, a, b, and c each satisfy $7 \leq x \leq 15$ at %, $4 \leq y \leq 20$ at %, $0 \leq a \leq 0.2$, $0 \leq b \leq 0.5$, and $0 \leq c \leq 0.9$. The magnet includes 80% by volume or more of a main phase composed of a compound of a $ThMn_{12}$ type crystal, the main phase having an average crystal grain size of 1 μm or more, and an intergranular grain boundary phase being formed between adjacent main phase grains.

7 Claims, 2 Drawing Sheets

(56) References Cited

U.S. PATENT DOCUMENTS

| | | | |
|---|---|---|---|
| 2023/0144451 | A1 | 5/2023 | Nomura et al. |

FOREIGN PATENT DOCUMENTS

| | | | |
|---|---|---|---|
| JP | 2017-112300 | A | 6/2017 |
| JP | 2019-44259 | A | 3/2019 |
| JP | 2019-54217 | A | 4/2019 |
| JP | WO 2019/151244 | A1 | 8/2019 |
| JP | 2020-17575 | A | 1/2020 |
| JP | 2020-155762 | A | 9/2020 |
| WO | WO 2017/164312 | A1 | 9/2017 |
| WO | WO 2021/193333 | A1 | 9/2021 |

* cited by examiner

ANISOTROPIC RARE EARTH SINTERED MAGNET AND METHOD FOR PRODUCING SAME

CROSS REFERENCE TO RELATED APPLICATIONS

This application is a National Stage entry under 35 U.S.C. § 371 of PCT/JP2021/011008, filed on Mar. 18, 2021, and claims priority to Japanese Patent Application No. 2020-055766, filed on Mar. 26, 2020. The entire contents of both are incorporated herein by reference.

TECHNICAL FIELD

The present invention relates to an anisotropic rare earth sintered magnet having a compound of a $ThMn_{12}$ type crystal as a main phase, and to a method for producing the same.

BACKGROUND ART

The demand for rare earth magnets, in particular, Nd—Fe—B sintered magnets is expected to increase more and more in the future and the production amount thereof is expected to increase more and more in the background of motorization of automobiles, high performance and power saving of industrial motors, and the like. On the other hand, since there is concern about the risk that the supply and demand balance of rare earth raw materials will be lost in the future, research on rare earth saving in rare earth magnets has been attracting attention in recent years. Among them, compounds having a $ThMn_{12}$ type crystal structure have a lower content of rare earths than $R_2Fe_{14}B$ compounds and have good magnetic properties, so that they have been actively studied as next-generation magnetic materials.

For example, PTL 1 reports permanent magnets made of alloys containing a hard magnetic phase having a $ThMn_{12}$ type tetragonal structure and a nonmagnetic phase. Here, it is shown that by adding at least one element selected from Cu, Si, Mg, Sn, Pb, and In to an intermetallic compound mainly composed of a rare earth element-Fe, a phase having a melting point lower than that of the main phase and being nonmagnetic is precipitated.

In addition, PTL 2 reports a rare earth permanent magnet having a main phase and a grain boundary phase, wherein the main phase is an R-T compound having a $ThMn_{12}$ type crystal structure (wherein R is one or more rare earth elements in which La is essential, and T is Fe, or Fe and Co, or an element in which a part thereof is substituted with M (one or more elements selected from Ti, V, Cr, Mo, W, Zr, Hf, Nb, Ta, Al, Si, Cu, Zn, Ga, and Ge)), wherein the grain boundary phase has a cubic crystal structure, and has 20% or more of a La-rich phase σ having a La composition ratio of 20 at % or more in cross-sectional area ratio. By including the non-magnetic cubic La-rich phase in the grain boundary portion, a magnetic separation effect between the main phases and an interfacial distortion reduction effect between the grain boundary phase and the main phase are obtained.

PTL 3 reports rare earth magnets including a main phase having a $ThMn_{12}$ type crystal structure and a subphase containing any one of a $Sm_5Fe_{17}$ base phase, a $SmCo_5$ base phase, a $Sm_2O_3$ base phase, and a $Sm_7Cu_3$ base phase, wherein the subphase has a volume fraction of 2.3 to 9.5%. Among these subphases, the $Sm_5Fe_{17}$ base phase and the $SmCo_5$ base phase are magnetic phases exhibiting magnetic anisotropies higher than that of the main phase, and isolate crystal grains of the main phase from each other and prevent a domain wall in the main phase from moving, thereby improving the magnetization and coercive force of the magnets. On the other hand, the $Sm_2O_3$ base phase and the $Sm_7Cu_3$ base phase are non-magnetic phases, and by isolating the crystal grains of the main phase from each other, the magnetization reversal of the main phase is prevented from propagating to the surroundings, thereby improving the magnetization and coercive force of the magnets. PTL 3 also describes that the $Sm_7Cu_3$ base phase is a non-equilibrium phase.

PTL 4 reports alloys for rare earth magnets which have a main phase and one or more subphases and whose composition satisfies $R(Fe,Co)_{w-z}Ti_zCu_\alpha$ (wherein R is at least one of rare earth elements, $8 \le w \le 13$, $0.42 \le z \le 0.70$, and $0.40 \le \alpha \le 0.70$). In addition, it is also described that the subphase is mainly a crystal phase in which 50 mol % or more of the entire subphase is a Cu composition, and the crystal structure of the subphase is a $KHg_2$ type.

PTL 5 reports rare earth permanent magnets having a structure $R_xFe_{100-x-y}(V_{1-a}Si_a)_y$ (wherein R represents one or more rare earth elements including Y, x=5.5 to 18 at %, y=8 to 20 at %, and a=0.05 to 0.7) and having a $ThMn_{12}$ type body-centered tetragonal structure as a main phase. It is described that this composition alloy is composed of a main phase and a rare earth-rich phase and does not contain an $RFe_2$ phase.

CITATION LIST

Patent Literature

PTL 1: JP 2001-189206 A
PTL 2: WO 2017/164312 A
PTL 3: JP 2017-112300 A
PTL 4: JP 2019-044259 A
PTL 5: JP 06-231920 A

SUMMARY OF INVENTION

Technical Problem

As described above, in order to obtain good magnetic properties in magnets having a $ThMn_2$ type compound as a main phase, it has been proposed to form a structure composed of a main phase and a grain boundary phase as in Nd—Fe—B base magnets, and non-magnetic phases such as a La-rich phase (PTL 2) and an R—Cu phase (PTLs 1 and 4) have been studied as a grain boundary phase. However, in practice, these phases are segregated at grain boundary triple junctions or the like and it is difficult to form an intergranular grain boundary phase, and there is a problem in that it is difficult to obtain a structure in which the surface of the main phase grains is covered with the grain boundary phase.

Further, in PTL 3, the surfaces of the main phase grains are surrounded by a $Sm_5Fe_{17}$ base phase or a $SmCo_5$ base phase, which is a magnetic phase exhibiting high magnetic anisotropy, and the coercive force is improved by pinning the domain wall by this phase. However, it is difficult to realize a structural form in which the surfaces of the crystal grains of the $ThMn_{12}$ type compound are surrounded by the $Sm_5Fe_{17}$ base phase or the $SmCo_5$ base phase.

On the other hand, PTL 5 proposes alloys composed of a $ThMn_{12}$ main phase and an R-rich phase. In practice, however, since the composition range in which only two phases are formed in the R—Fe—V—Si quaternary system is extremely limited, it is difficult to produce this structure with good reproducibility.

The present invention has been made in view of the above problems, and an object of the present invention is to provide an anisotropic rare earth sintered magnet having a compound of a $ThMn_{12}$ type crystal having good magnetic properties as a main phase.

Solution to Problem

As a result of intensive studies to achieve the above object, the present inventors have found that high coercive force is exhibited when an intergranular grain boundary phase is formed between adjacent main phase grains in anisotropic rare earth sintered magnets having a compound of a $ThMn_{12}$ type crystal as a main phase, and completed the present invention.

Accordingly, the present invention provides the following anisotropic rare earth sintered magnet and a method for producing the same.

(1) An anisotropic rare earth sintered magnet represented by the formula $(R_{1-a}Zr_a)_x(Fe_{1-b}Co_b)_{100-x-y}(M^1_{1-c}M^2_c)_y$ (wherein R is at least one element selected from rare earth elements and Sm is essential; $M^1$ is at least one element selected from the group consisting of V, Cr, Mn, Ni, Cu, Zn, Ga, Al, and Si; $M^2$ is at least one element selected from the group consisting of Ti, Nb, Mo, Hf, Ta, and W; x, y, a, b, and c each satisfy $7 \leq x \leq 15$ at %, $4 \leq y \leq 20$ at %, $0 \leq a \leq 0.2$, $0 \leq b \leq 0.5$, and $0 \leq c \leq 0.9$), the magnet including 80% by volume or more of a main phase composed of a compound of a $ThMn_{12}$ type crystal, the main phase having an average crystal grain size of 1 μm or more, and an intergranular grain boundary phase being formed between adjacent main phase grains.

(2) The anisotropic rare earth sintered magnet as set forth in (1), wherein the intergranular grain boundary phase contains R in an amount of 20 at % or more.

(3) The anisotropic rare earth sintered magnet as set forth in (1) or (2), wherein the intergranular grain boundary phase has a thickness of 0.5 nm or more.

(4) The anisotropic rare earth sintered magnet as set forth in any one of (1) to (3), wherein an R-rich phase is contained in a grain boundary portion.

(5) The anisotropic rare earth sintered magnet as set forth in any one of (1) to (4), wherein an $R(Fe,Co)_2$ phase is contained in a grain boundary portion.

(6) The anisotropic rare earth sintered magnet as set forth in (4) or (5), wherein the R-rich phase and the $R(Fe,Co)_2$ phase are contained in an amount of 1% by volume or more in total.

(7) The anisotropic rare earth sintered magnet as set forth in any one of (4) to (6), wherein a Sm/R ratio in an inner portion of the main phase grain is lower than Sm/R ratios of the R-rich phase and the $R(Fe,Co)_2$ phase.

(8) The anisotropic rare earth sintered magnet as set forth in any one of (1) to (7), wherein a Sm/R ratio in an inner portion of the main phase grain is lower than a Sm/R ratio in an outer shell portion of the main phase grain.

(9) The anisotropic rare earth sintered magnet as set forth in (7) or (8), wherein Sm is not contained in an inner portion of the main phase grain.

(10) The anisotropic rare earth sintered magnet as set forth in any one of (1) to (9), wherein the magnet exhibits a coercive force of 5 kOe or more at room temperature, and a temperature coefficient ß of the coercive force is −0.5%/K or more.

(11) A method for producing the anisotropic rare earth sintered magnet as set forth in any one of (1) to (10), including: pulverizing an alloy containing a compound phase of a $ThMn_{12}$ type crystal; compacting the pulverized alloy under application of a magnetic field to form a compact; and then sintering the compact at a temperature of 800° C. or higher and 1400° C. or lower.

(12) The method for producing an anisotropic rare earth sintered magnet as set forth in (11), including: pulverizing and mixing an alloy containing a compound phase of a $ThMn_{12}$ type crystal and an alloy having a higher R composition ratio and a higher Sm/R ratio; and compacting the mixture under application of a magnetic field to form a compact.

(13) The method for producing an anisotropic rare earth sintered magnet as set forth in (11) or (12), including: bringing a material containing Sm into contact with a sintered body having a compound phase of a $ThMn_{12}$ type crystal as a main phase; and subjecting to heat treatment at a temperature of 600° C. or higher and a sintering temperature or lower to diffuse Sm into the sintered body.

(14) The method for producing an anisotropic rare earth sintered magnet as set forth in (13), wherein the material containing Sm to be brought into contact with the sintered body is at least one selected from Sm metal, Sm-containing alloy, Sm-containing compound, and Sm-containing vapor, and a form thereof is at least one selected from powder, thin film, thin strip, foil, and gas.

(15) The method for producing an anisotropic rare earth sintered magnet as set forth in any one of (11) to (14), including subjecting the sintered body to heat treatment at a temperature of 300 to 900° C.

Advantageous Effects of Invention

According to the present invention, it is possible to obtain anisotropic rare earth sintered magnets having a compound of a $ThMn_{12}$ type crystal as a main phase and exhibiting good magnetic properties.

DESCRIPTION OF EMBODIMENTS

Figure 1:
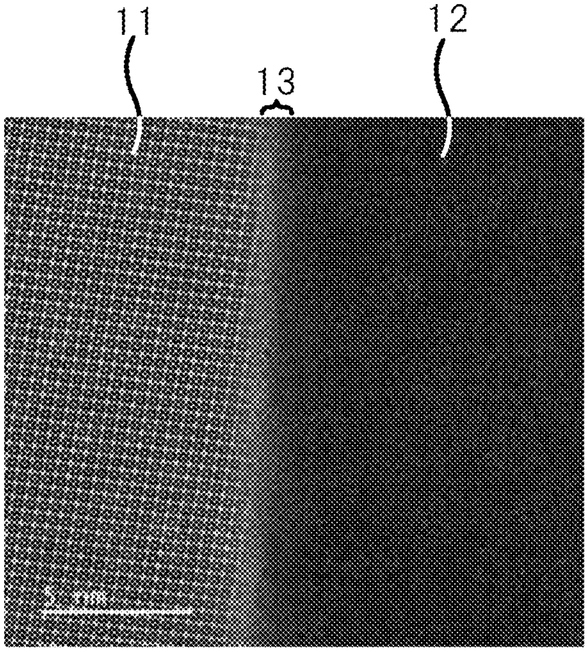
FIG. 1 is an HAADF image of a structure of the sintered magnet of Example 1 observed by STEM.

Hereinafter, embodiments of the present invention will be described. An anisotropic rare earth sintered magnet according to the present invention is an anisotropic rare earth sintered magnet which is represented by the following formula $(R_{1-a}Zr_a)_x(Fe_{1-b}Co_b)_{100-x-y}(M^1_{1-c}M^2_c)_y$, has a compound of a $ThMn_{12}$ type crystal as a main phase, contains 80% by volume or more of a main phase composed of the compound of a $ThMn_{12}$ type crystal, has an average crystal grain size of the main phase of 1 μm or more, and in which an intergranular grain boundary phase is formed between adjacent main phase grains. Here, x, y, a, b, and c satisfy $7 \le x \le 15$ at %, $4 \le y \le 20$ at %, $0 \le a \le 0.2$, $0 \le b \le 0.5$, and $0 \le c \le 0.9$, respectively. As described above, since the composition range is wide, the anisotropic rare earth sintered magnet of the present invention can be easily produced with good reproducibility.

First, each component will be described below.

R is one or more elements selected from rare earth elements, and Sm is essential. Specifically, R essentially contains Sm, and may be a combination of Sm and one or more elements selected from Sc, Y, La, Ce, Pr, Nd, Eu, Gd, Tb, Dy, Ho, Er, Tm, Yb, and Lu. R is an element necessary for forming a compound having a $ThMn_{12}$ type crystal structure as a main phase. The content of R is 7 at % or more and 15 at % or less. The content is more preferably 8 at % or more and 12 at % or less. When the content is less than 7 at %, an α-Fe phase is precipitated and it is difficult to sinter, and on the other hand, when the content exceeds 15 at %, the volumetric ratio of the $ThMn_{12}$ type compound phase is lowered and good magnetic properties cannot be obtained. Since the $ThMn_{12}$ type compound exhibits a particularly high anisotropic magnetic field $H_A$ when R is Sm, Sm is essential for the anisotropic rare earth sintered magnet of the present invention. When there is no difference in Sm concentration between the inner portion and the outer shell portion of the main phase grain, Sm contained in R is preferably 5% or more, more preferably 10% or more, and particularly preferably 20% or more of R in terms of atomic ratio. When the Sm ratio is in such a range, the effect of increasing $H_A$ is sufficient, and a high coercive force can be obtained.

On the other hand, since Sm is less produced than Y, La, Ce, Pr, Nd and the like and has a restriction in terms of resources, it is preferable to utilize Sm as effectively as possible. Therefore, as a structural form in which Sm is concentrated in the outer shell portion of the main phase grain, a high coercive force may be obtained with a smaller Sm content. In the case of having a structure in which the Sm concentration is different between the inner portion and the outer shell portion of the main phase grain as described above, the amount of Sm contained in R is preferably 0.1 at % or more and 50 at % or less of R in terms of atomic ratio. It is more preferably 0.2 at % or more and 40 at % or less, and particularly preferably 0.5 at % or more and 30 at % or less. More preferably, R is a combination of Sm and one or more elements selected from Y, La, Ce, Pr, and Nd.

Zr substitutes for R in the $ThMn_{12}$ type compound and has an effect of enhancing the phase-stability. The content of Zr substituting for R is 20% or less of R in atomic ratio. If it exceeds 20%, $H_A$ of the $ThMn_{12}$ type compound is decreased and it is difficult to obtain a high coercive force.

It is known that a third element M is required together with R and Fe as constituent elements in order to stably exist the $ThMn_{12}$ type crystal structure. In the anisotropic rare earth sintered magnet of the present invention, $M^1$ is at least one element selected from the group consisting of V, Cr, Mn, Ni, Cu, Zn, Ga, Al, and Si, and serves as the third element. $M^1$ is an element which is more likely to form a compound with R than Fe or is less likely to bond with both Fe and R, as compared with $M^2$ which also acts as the third element as described later. One of the features of the anisotropic rare earth sintered magnet of the present invention is that the R-rich phase and the $R(Fe,Co)_2$ phase are present in the grain boundary portion together with the $ThMn_{12}$ type compound as the main phase in the magnet structure, and by selecting the $M^1$ element as the third element, it becomes easy to obtain a structure in which these three phases stably coexist. When $M^1$ and $M^2$ are collectively expressed as M, the content of $M^1$ accounts for at least 10% or more of M in atomic ratio. It is more preferably 30% or more, and still more preferably 50% or more. When the content of $M^1$ is less than 10%, the R-rich phase among the three phases is not stably formed. In addition, the content of M, which is the sum of $M^1$ and $M^2$, is 4 at % or more and 20 at % or less. When the content of M is less than 4 at %, the main phase of the $ThMn_{12}$ type compound is not sufficiently formed, and when it exceeds 20 at %, the amount of different phases formed increases and good magnetic properties are not exhibited.

The R-rich phase is a phase having a higher concentration of rare earth elements than the main phase. The $R(Fe,Co)_2$ phase has a $MgCu_2$ structure and is a compound phase called a Laves phase.

$M^2$ is one or more elements selected from Ti, Nb, Mo, Hf, Ta, and W. $M^2$ also has an effect of stabilizing the $ThMn_{12}$ type crystal structure, but when it is excessively contained, carbide such as a $M^2C$ phase and a $(Fe,Co)_2M^2$ phase which is a $MgZn_2$ type compound precipitate in the main phase and at the grain boundary portion. In particular, the $(Fe,Co)_2M^2$ phase may have a Fe-rich composition rather than a stoichiometric composition, for example, like the $Fe_2Ti$ phase, and may exhibit ferromagnetism, which adversely affects the magnetic properties of the sintered magnet. When only $M^2$ is selected as the third element without containing $M^1$, it is difficult to stably form the R-rich phase. Therefore, in the case of a composition containing $M^2$, its content is at least 90% or less of M in atomic ratio.

The anisotropic rare earth sintered magnet of the present invention contains Fe as an essential constituent element together with Sm and $M^1$. Further, a part of Fe may be substituted with Co. The substitution with Co has the effect of raising the Curie temperature $T_c$ of the $ThMn_{12}$ type compound as the main phase and increasing the saturation magnetization Ms. The substitution ratio of Co is 50% or less in atomic ratio. When the substitution ratio exceeds 50%, Ms is decreased. The proportion of Fe and Co is the balance of R, Zr, $M^1$, and $M^2$. However, in addition thereto, inevitable impurities taken in from raw materials or mixed in a production process, specifically, H, B, C, N, O, F, P, S, Mg, Cl, Ca, and the like may be contained in an amount of up to 3% by weight in total.

Next, the phases constituting the anisotropic rare earth sintered magnet of the present invention will be described.

The main phase in the anisotropic rare earth sintered magnet of the present invention is composed of an $R(Fe,Co,M)_{12}$ compound having a $ThMn_{12}$ type crystal structure. It is preferable that elements such as C, N, and O which are inevitably mixed in a process of producing the sintered magnet are not contained in the main phase. However, when C, N, and O elements are detected by composition analysis using an EPMA (electron probe micro analyzer) due to measurement variation, an adjustment method of an observation sample, influence of detection signals of other elements, and the like, the upper limit of each of them is preferably 1 at % from the viewpoint of obtaining $H_A$ of the main phase satisfactorily. The average crystal grain size of the main phase is 1 μm or more, and preferably 1 μm or more and 30 μm or less. The average crystal grain size is more preferably in a range of 1.5 μm or more and 20 μm or less, and particularly preferably 2 μm or more and 10 μm or less. By setting the average crystal grain size in such a range, it is possible to suppress a decrease in residual magnetic flux density $B_r$ due to a decrease in the degree of orientation of crystal grains and a decrease in coercive force $H_{cJ}$. From the viewpoint of obtaining good $B_r$ and $H_{cJ}$, the volume fraction of the main phase is 80% by volume or more, preferably 80% by volume or more and less than 99% by volume, and more preferably 90% by volume or more and 95% by volume or less with respect to the entire magnet.

The average crystal grain size of the main phase is a value measured as follows.

After the cross section of the sintered magnet was polished until it becomes a mirror surface, the sintered magnet was immersed in an etching solution (a mixed solution of nitric acid, hydrochloric acid, and glycerin, or the like) to selectively remove the grain boundary phase, and arbitrary 10 or more portions of the cross section were observed with a laser microscope. The cross-sectional area of each grain was calculated from the obtained observation image by image analysis, and the average diameter when these were regarded as circles was taken as the average crystal grain size.

Further, the volume fraction of the main phase is a value measured as follows.

The structure of the anisotropic rare earth sintered magnet was observed and the composition of each phase was analyzed using EPMA to confirm the main phase, the R-rich phase, and the $R(Fe,Co)_2$ phase. The volume fraction of each phase was calculated as being equal to the area ratio in the backscattered electron image.

In order to effectively utilize Sm, a structure may be adopted in which Sm is concentrated in the outer shell portion of the main phase grains, and grains having a lower Sm concentration in the inner portion of the main phase grains than the outer shell portion are present. In this case, the thickness of the high-Sm outer shell portion is not particularly limited, but is preferably 1 nm to 2 μm, and particularly preferably 2 nm to 1 μm, from the viewpoint of sufficiently obtaining the effect of suppressing nucleation of reverse magnetic domain in the outer shell portion of the main phase grains, and from the viewpoint of suppressing a situation in which the effect of reducing Sm cannot be sufficiently obtained due to an increase in the Sm content in the entire sintered body. Such a form is generated by making the Sm/R ratio (atomic ratio of Sm to R) in the R-rich phase or the $R(Fe,Co)_2$ phase higher than the Sm/R ratio in the inner portion of the main phase grains. A structure in which Sm is not contained in the inner portion of the main phase grains is more preferable. Further, main phase grains having a uniform Sm concentration distribution may be partially included.

The R-rich phase and the $R(Fe,Co)_2$ phase are formed in the grain boundary portion of the magnet structure. The grain boundary portion includes grain boundary triple junctions in addition to an intergranular grain boundary phase. Here, the R-rich phase is a phase containing 40 at % or more of R. The present inventors have found that magnets containing three phases, i.e., a main phase, an $R(Fe,Co)_2$ phase, and an R-rich phase, can be easily obtained when the above-described composition containing the $M^1$ element is used. For example, in Sm—Fe—Ti ternary system sintered magnets containing no $M^1$ element, there is a composition region in which three phases of a $Sm(Fe,Ti)_{12}$ main phase and $SmFe_2$ and $Fe_2Ti$ (excluding oxides and the like) are in equilibrium, but the $Sm(Fe,Ti)_{12}$ main phase and the Sm-rich phase are difficult to be in equilibrium at a low temperature of 400° C. or lower, and thus the Sm-rich phase is not formed as a stable phase. On the other hand, in the case of Sm—Fe—V ternary system using V which is one of $M^1$ elements, a Fe—V binary compound is not formed, but a Sm-rich phase having a high Sm concentration is formed, and a magnet in which three phases of $Sm(Fe,V)_{12}$, $SmFe_2$, and Sm-rich phase are present can be obtained. Further, in Sm—Fe—V—Ti quaternary system containing both $M^1$ and $M^2$, four phases of $Sm(Fe,V,Ti)_{12}$, $Fe_2(V,Ti)$, $SmFe_2$, and Sm-rich phase can be stably present. In the anisotropic rare earth sintered magnet of the present invention, based on these findings, a composition containing a predetermined amount of $M^1$ elements is selected in order to form the R-rich phase and the $R(Fe,Co)_2$ phase in the grain boundary portion.

The R-rich phase and the $R(Fe,Co)_2$ phase mainly provide four effects. The first effect is an action of promoting sintering. At the sintering temperature, both the R-rich phase and the $R(Fe,Co)_2$ phase are melted to form a liquid phase, so that liquid phase sintering proceeds, and sintering is completed more rapidly than solid phase sintering that does not contain these phases. In addition, when the R-rich phase and the $R(Fe,Co)_2$ phase coexist, the liquid phase formation temperature tends to decrease compared to the case of only one of the phases, and the liquid phase sintering proceeds more rapidly.

The second effect is cleaning of the surface of the main phase grains. Since the anisotropic rare earth sintered magnet of the present invention has a nucleation type coercive force mechanism, it is desirable that the surface of the main phase grains is smooth so that nucleation of reverse magnetic domains is difficult to occur. The R-rich phase and the $R(Fe,Co)_2$ phase serve to smooth the surfaces of the crystal grains of the $ThMn_{12}$ type compound in the sintering step or the subsequent aging step, and this cleaning effect suppresses nucleation of reverse magnetic domains, which causes a decrease in coercive force. In particular, the $R(Fe,Co)_2$ phase has relatively high wettability to the $ThMn_{12}$ phase compared to other phases having less than 40 at % of R, for example, compound phases such as $RM_3$, $RM_2$, $R(Fe,Co)M$, and $R(Fe,Co)_2M_2$, and easily covers the surfaces of the main phase grains, and thus has a large cleaning effect.

The third effect is the formation of an intergranular grain boundary phase. In a magnet containing an R-rich phase in the structure, an intergranular grain boundary phase containing a larger amount of R than the main phase is formed between adjacent $ThMn_{12}$ type compound main phase grains by performing an optimum sintering treatment or aging treatment. As a result, the magnetic interaction between the main phase grains is weakened, and the sintered magnet exhibits a high coercive force. However, since the composition region in which only two phases of the $ThMn_{12}$ type compound main phase and the R-rich phase are in equilibrium is extremely limited, it is difficult to stably produce such a magnet in consideration of composition variation. A magnet containing three phases of the $ThMn_{12}$ type compound main phase, the R-rich phase, and the $R(Fe,Co)_2$ phase can stably form a structure in which the surface of the main phase grain is covered with the intergranular grain boundary phase. In addition, in a magnet in which the R-rich phase does not exist, since it is difficult to form the intergranular grain boundary phase or it is difficult to cover the surface of the main phase grain with the intergranular grain boundary phase, it is difficult to obtain a magnet exhibiting sufficient coercive force.

The fourth effect is to increase the Sm concentration in the grain boundary portion. When the grain boundary diffusion method is applied as a production method in order to obtain a structure in which the Sm concentration is different between the inner portion and the outer shell portion of the main phase grain, the R-rich phase and the $R(Fe,Co)_2$ phase present in the grain boundary portion become liquid phases during the diffusion treatment, and play a role of diffusing and permeating Sm provided on the sintered body into the inner portion. Therefore, the Sm/R ratio in at least one of the R-rich phase and the $R(Fe,Co)_2$ phase becomes higher than the Sm/R ratio in the inner portion of the main phase grain. When a dual-alloy method is applied as the production method, the Sm/R ratio in at least one of the R-rich phase and the $R(Fe,Co)_2$ phase of the sintered body becomes higher than the Sm/R ratio in the inner portion of the main phase grain by using a first alloy mainly composed of the $ThMn_{12}$ type compound phase and a second alloy having a higher R composition ratio and a higher Sm/R ratio than the first alloy. When Sm is concentrated in the R-rich phase or the $R(Fe,Co)_2$ phase, the Sm concentration in the outer shell portion of the main phase grain in contact with these grain boundary phases is also increased, and $H_A$ is improved to increase the coercive force of the sintered magnet.

As described above, the R-rich phase contains at least 40 at % or more of R. When the content of R is less than 40 at %, the wettability with the main phase is not sufficient, so that the above-described effect is hardly obtained. More preferably, R contains 50 atoms or more, and particularly preferably R contains 60 atoms or more. The R-rich phase may be an R-metal phase such as the above-described Sm phase, or may be an amorphous phase or an intermetallic compound having a high R composition and a low melting temperature, such as $R_3(Fe,Co,M)$, $R_2(Fe,Co,M)$, $R_5(Fe,Co,M)_3$, and $R(Fe,Co,M)$. In addition, Fe, Co, the M element, and impurity elements such as H, B, C, N, O, F, P, S, Mg, Cl, and Ca may be contained up to 60 at % in total.

On the other hand, the $R(Fe,Co)_2$ phase is a Laves compound of a $MgCu_2$ type crystal, but when composition analysis is performed using EPMA or the like, R is contained in an amount of 20 at % or more and less than 40 at % in consideration of measurement variation or the like. Further, a part of Fe and Co may be substituted with the M element. However, the substitution amount of M is within a range in which the $MgCu_2$ type crystal structure is maintained.

The $R(Fe,Co)_2$ phase in the anisotropic rare earth sintered magnet of the present invention is a magnetic phase. The term "magnetic phase" as used herein refers to a phase exhibiting ferromagnetism or ferrimagnetism and having a Curie temperature $T_c$ of equal to or higher than room temperature (23° C.). $T_c$ of $RFe_2$ is equal to or higher than room temperature except for $CeFe_2$, and $T_c$ of $CeFe_2$ is also equal to or higher than room temperature when 10% or more of R is substituted with another element. On the other hand, $RCo_2$, except $GdCo_2$, has a $T_c$ of room temperature or lower or is a paramagnetic phase, but in the anisotropic rare earth sintered magnet of the present invention, since the substitution atomic ratio of Fe by Co is 0.5 or less, the $R(Fe,Co)_2$ phase becomes a magnetic phase in most cases. Generally, a soft magnetic phase contained in the structure often adversely affects the magnetic properties, but in the anisotropic rare earth sintered magnet of the present invention, the effect of cleaning the surface of the main phase grains by the $R(Fe,Co)_2$ phase and the effect of forming the intergranular grain boundary phase are larger, and it is considered that even the magnetic phase contributes to an increase in the coercive force.

The total amount of the R-rich phase and the $R(Fe,Co)_2$ phase formed is preferably 1% by volume or more, and more preferably 1% by volume or more and less than 20% by volume. Further, the total amount of the R-rich phase and the $R(Fe,Co)_2$ phase is still more preferably 1.5% by volume or more and less than 15% by volume, and even more preferably 2% by volume or more and less than 10% by volume. In such a range, an area in contact with the main phase grains is secured, and an effect of increasing $H_{cJ}$ is easily obtained. In addition, a decrease in $B_r$ is also suppressed, and desired magnetic properties are easily obtained.

In the anisotropic rare earth sintered magnet of the present invention, as described above, the R-rich phase and the $R(Fe,Co)_2$ phase are present in the grain boundary portion, and the intergranular grain boundary phase is formed between adjacent main phase grains composed of the $ThMn_{12}$ type compound. Since the surfaces of the main phase grains are covered with the intergranular grain boundary phase, the magnetic interaction between the main phase grains is weakened, and a high coercive force is exhibited.

The intergranular grain boundary phase may be amorphous with disordered atomic arrangement, or may have regularity in atomic arrangement. In addition, the intergranular grain boundary phase may be the same phase as the R-rich phase or the $R(Fe,Co)_2$ phase which is present at the grain boundary triple junctions. When the intergranular grain boundary phase is observed using an apparatus such as a scanning transmission electron microscope (STEM), the composition thereof preferably contains 20 at % or more of R. When the content is in such a range, magnetic coupling between main phase grains can be sufficiently reduced, and a high coercive force can be easily obtained. The intergranular grain boundary phase has a thickness of preferably 0.5 nm or more. This makes it easy to ensure the magnetic separation effect between the main phase grains, and a sufficient coercive force improvement effect can be obtained. Further, the thickness is preferably 1 μm or less, more preferably 0.5 μm or less, and still more preferably 100 nm or less. Within such a range, it is easy to suppress that the influence of the deterioration of the magnetic properties due to the decrease in the volume fraction of the main phase grains becomes larger than the effect of the increase in the coercive force.

From the STEM image, the thickness of the intergranular grain boundary phase was measured as follows.

Using a STEM apparatus (JEM-ARM200F manufactured by JEOL Co., Ltd.), at least three portions of one sample where adjacent main phase grains were in contact with each other were observed. The thickness of the intergranular grain boundary phase was measured from an HAADF (High-Angle Annular Dark Field) image obtained by the observation, and the average value of these thicknesses was taken as the thickness of the intergranular grain boundary phase.

In addition, the anisotropic rare earth sintered magnet of the present invention may contain R oxide, R carbide, R nitride, M carbide, and the like formed by C, N, and O inevitably mixed therein. From the viewpoint of suppressing deterioration of magnetic properties, the volume fraction thereof is preferably equal to or less than 10% by volume, more preferably equal to or less than 5% by volume, and particularly preferably equal to or less than 3% by volume.

It is preferable that the number of phases other than those described above be as small as possible. For example, when the case where an $R_2(Fe,Co,M)_{17}$ phase and an $R_3(Fe,Co,M)_{29}$ phase are present in the magnet structure, the amount of each phase formed should be less than 1% by volume from the viewpoints of the influence on the magnetic properties and the suppression of the decrease in the coercive force due to the influence. In addition, from the viewpoint of ensuring a sufficient ratio of the main phase, it is preferable that each of the $(Fe,Co)_2M$ phase, and $RM_3$, $RM_2$, $R(Fe,Co)M$, $R(Fe,Co)_2M_2$, and the like, in which R is less than 40 at %, is less than 1% by volume. The total amount of these phases is preferably 3% by volume or less. Furthermore, it is preferable that an α-(Fe,Co) phase is not contained in the anisotropic rare earth sintered magnet of the present invention from the viewpoint of preventing significant deterioration in magnetic properties.

Next, a production method will be described. The anisotropic rare earth sintered magnet of the present invention is produced by a powder metallurgy method. First, in order to prepare a raw material alloy, metal raw materials of R, Fe, Co, and M, alloys, ferroalloys, and the like are used, and adjustment is performed so that a finally obtained sintered body has a predetermined composition in consideration of raw material loss and the like during the production process. These raw materials are melted in a high-frequency furnace, an arc furnace or the like to prepare an alloy. A cooling from the molten metal may be performed by a casting method, or may be performed by a strip casting method. In the case of the strip casting method, it is preferable to prepare the alloy so that the average crystal grain size of the main phase or the average grain boundary phase interval becomes 1 μm or more by adjusting the cooling rate. When it is less than 1 μm, the powder after fine pulverization becomes polycrystalline, and the main phase crystal grains are not sufficiently oriented in the step of compacting in a magnetic field, resulting in a decrease in $B_r$. When α-Fe is precipitated in the alloy, the alloy may be subjected to heat treatment so as to remove α-Fe and increase the amount of the $ThMn_{12}$ type compound phase formed. As the alloy, an alloy having a single composition may be used, or may be adjusted by preparing a plurality of alloys having different compositions and mixing powders thereof in a later step.

The above-described raw material alloys are coarsely pulverized into powder having an average grain size of 0.05 to 3 mm by a means such as mechanical pulverization using a brown mill or the like or hydropulverization. Alternatively, an HDDR method (hydrogen disproportionation desorption recombination method) used as a production method of an Nd—Fe—B base magnet may be applied. Further, the coarse powder is finely pulverized by a ball mill, a jet mill using high-pressure nitrogen, or the like to obtain a powder having an average grain size of 0.5 to 20 μm, more preferably 1 to 10 μm. If necessary, a lubricant or the like may be added before or after the fine pulverization step. Next, using a magnetic field press apparatus, the alloy powder is compacted while the axis of easy magnetization of the alloy powder is oriented in an applied magnetic field to form a powder compact. The compacting is preferably performed in a vacuum, a nitrogen gas atmosphere, an inert gas atmosphere such as Ar, or the like in order to suppress oxidation of the alloy powder.

The step of sintering the powder compact is performed in a vacuum or inert atmosphere at a temperature of 800° C. or higher and 1400° C. or lower using a sintering furnace. When the temperature is lower than 800° C., sintering does not proceed sufficiently, so that high sintered density cannot be obtained, and when the temperature exceeds 1400° C., the main phase of the $ThMn_{12}$ type compound is decomposed and α-Fe is precipitated. The sintering temperature is particularly preferably in the range of 900 to 1300° C. The sintering time is preferably 0.5 to 20 hours, and more preferably 1 to 10 hours. The sintering may be a pattern in which the temperature is raised and then held at a constant temperature, or a two step sintering pattern in which the temperature is raised to a first sintering temperature and then held at a lower second sintering temperature for a predetermined time may be used in order to refine the crystal grains. Further, sintering may be performed a plurality of times, or a spark plasma sintering method or the like may be applied.

The post-sintering cooling rate is not particularly limited, but cooling can be performed until least 600° C. or lower, preferably 200° C. or lower, at a cooling rate of preferably 1° C./min or more and 100° C./min or less, more preferably 5° C./min or more and 50° C./min or less. In order to improve the coercive force, an aging heat treatment may be further performed at 300 to 900° C. for 0.5 to 50 hours. $H_{cJ}$ is improved by optimizing the conditions of sintering and aging according to the composition, powder particle size, and the like. Further, the sintered body is cut and ground into a predetermined shape and subjected to magnetization to obtain a sintered magnet.

On the other hand, as a means of producing an anisotropic rare earth sintered magnet having main phase grains in which the Sm/R ratio in the inner portion of the main phase grains is lower than the Sm/R ratios of the R-rich phase and the $R(Fe,Co)_2$ phase, for example, a dual-alloy method and a grain boundary diffusion method can be exemplified.

When the dual-alloy method is used, metal raw materials of R, Fe, Co, and M, alloys, ferroalloys, and the like are used to prepare two kinds of raw material alloys having different compositions. Three or more kinds of alloys may be used. At this time, it is preferable to combine alloy A mainly composed of the $ThMn_{12}$ type compound phase and having a relatively low Sm/R ratio with alloy B having a relatively high R composition ratio and a relatively high Sm/R ratio so as to adjust the average composition to a predetermined composition. These alloys are prepared by a casting method or a strip casting method, and pulverized. The step of mixing each alloy powder may be performed in a coarse powder state before fine pulverization, or may be performed after fine pulverization. Further, compacting and sintering are performed to obtain a sintered body. In order to improve the coercive force, aging heat treatment may be performed.

In the sintered magnets produced by the dual-alloy method, a main phase composed of a $ThMn_{12}$ type compound is formed mainly by the components of the alloy A, and an R-rich phase, an $R(Fe,Co)_2$ phase, and an outer shell portion of main phase grains are formed mainly by the components of the alloy B. Therefore, the Sm/R atomic ratio of the R-rich phase or the $R(Fe,Co)_2$ phase formed in the grain boundary portion is higher than the Sm/R atomic ratio in the inner portion of the main phase grain. Further, a part of Sm in the grain boundary phase substitutes R atoms in the surface layer portion of the main phase grain to form a core-shell structure in which the Sm concentration is different between the surface layer portion and the inner portion of the grain, thereby increasing the coercive force.

On the other hand, in the grain boundary diffusion method, first, a sintered body is prepared in the same manner as described above by a single alloy method or a dual-alloy method. At this time, R in the composition of the sintered body may contain Sm or may not contain Sm.

Next, the obtained sintered body is subjected to grain boundary diffusion of Sm. After the sintered body is cut and ground as necessary, a diffusion material selected from compounds such as a metal, an alloy, an oxide, a fluoride, an oxyfluoride, a hydride, and a carbide containing Sm is provided on the surface thereof in the form of powder, a thin film, a thin strip, a foil, or the like. For example, a powder of the above-mentioned material may be mixed with water or an organic solvent to form a slurry, and the slurry may be coated on the sintered body and then dried, or the above-mentioned substance may be provided as a thin film on the surface of the sintered body by means of vapor deposition, sputtering, CVD or the like. The amount to be provided is preferably 10 to 1000 $\mu g/mm^2$, and particularly preferably 20 to 500 μg/mm$^2$. Within such a range, an increase in $H_{cJ}$ can be sufficiently obtained, and an increase in production cost due to an increase in the Sm content can be suppressed. Further, by utilizing the property of high vapor pressure of Sm, Sm metal or Sm alloy may be heat-treated together with the sintered body in the same chamber, and brought into contact with the sintered body as Sm vapor.

The sintered body is heat-treated in vacuum or in an inert gas atmosphere in a state where Sm is provided on the surface. The heat treatment temperature is preferably 600° C. or higher and a sintering temperature or lower, particularly preferably 700° C. or higher and 1100° C. or lower. The heat treatment time is preferably 0.5 to 50 hours, and particularly preferably 1 to 20 hours. The cooling rate after the heat treatment is not particularly limited, but is preferably 1 to 20° C./min, and particularly preferably 2 to 10° C./min. In order to improve the coercive force, an aging heat treatment may be further performed at 300 to 900° C. for 0.5 to 50 hours.

Sm provided on the sintered body penetrates into the sintered body while increasing the Sm concentration of the R-rich phase or the $R(Fe,Co)_2$ phase by heat treatment, and the Sm/R ratio of these grain boundary phases is increased. When the Sm concentration in the grain boundary phase becomes high, substitution of R atoms by Sm occurs also in the surface layer portion of the main phase grain in contact with the grain boundary phase, the Sm/R ratio in the surface layer portion of the main phase grain becomes higher than the Sm/R ratio in the inner portion of the main phase grain, and $H_{cJ}$ is increased.

The anisotropic rare earth sintered magnet of the present invention thus produced exhibits a residual magnetic flux density $B_r$ of 5 kG or more and a coercive force $H_{cJ}$ of at least 5 kOe or more, at room temperature. The $H_{cJ}$ at room temperature is more preferably 8 kOe or more. Further, the temperature coefficient ß of the coercive force is −0.5%/K or more. Here, $ß=\Delta H_{cJ}/\Delta T\times100/H_{cJ}$ (20° C.) ($\Delta H_{cJ}=H_{cJ}$ (20° C.)−$H_{cJ}$ (140° C.), ΔT=20-140 (° C.)) is set. The anisotropic rare earth sintered magnet of the present invention has a smaller temperature change in coercive force than that of an Nd—Fe—B sintered magnet, and is suitable for use at high temperatures.

EXAMPLES

Hereinafter, the present invention will be specifically described with reference to Examples and Comparative Examples, but the present invention is not limited to the following Examples.

Example 1

Sm metal, electrolytic iron, ferrovanadium, Al metal, and Si were used to control a composition, and the composition was melted in an Ar gas atmosphere by a high-frequency induction furnace to prepare a cast alloy. In order to eliminate the primary α-Fe, the alloy was subjected to heat treatment at 900° C. for 50 hours. The structure of the obtained alloy was observed with a laser microscope (LEXT OLS4000 manufactured by Olympus Corporation), and it was confirmed from the observed image that the average crystal grain size of the main phase was 5 μm or more. After hydrogen storage treatment was performed on the alloy, the alloy was subjected to dehydrogenation treatment by heating at 400° C. in a vacuum to obtain a coarse powder, and pulverized by a jet mill in a nitrogen stream to obtain a fine powder having an average grain size of 1.8 μm. Further, the fine powder was filled in a die of a compacting device in an inert gas atmosphere, and was press-formed at a pressure of 0.6 Ton/cm$^2$ in a direction perpendicular to a magnetic field while being oriented in the magnetic field of 15 kOe (=1.19 MA/m) to obtain a powder compact. The powder compact was sintered in an Ar gas atmosphere at 1140° C. for 3 hours, and then cooled to room temperature at a cooling rate of 13° C./min to obtain a sintered body.

The composition of the sintered body analyzed by high-frequency inductively coupled plasma optical emission spectrometry (ICP-OES) using a high-frequency inductively coupled plasma optical emission spectrometer (SPS3520UV-DD manufactured by Hitachi High-Tech Science Corporation) was $Sm_{10.2}Fe_{bal.}V_{14.9}Al_{0.5}Si_{0.2}$. Further, it was confirmed by X-ray diffraction that the crystal structure of the main phase was $ThMn_{12}$ type. The structure observation of the sintered body and the composition analysis of the formed phase were performed using an EPMA apparatus (JXA-8500F manufactured by JEOL Ltd.), and it was confirmed that an R-rich phase and an $R(Fe,Co)_2$ phase were formed at the grain boundary triple junctions. The volume fractions of the main phase, the R-rich phase, and the $R(Fe,Co)_2$ phase were calculated as being equal to the area ratio in the backscattered electron image. As a result, in the grain boundary portion of the sintered body structure, an R-rich phase and an $R(Fe,Co)_2$ phase were present each in an amount of 1% by volume or more. The average crystal grain size of the main phase calculated from the results of etching and observation of the sintered body sample was 9.9 μm. Furthermore, the $H_{cJ}$ at room temperature measured with a B—H tracer was 8.5 kOe, and the temperature coefficient ß of $H_{cJ}$ was −0.46%/K.

Figure 2:
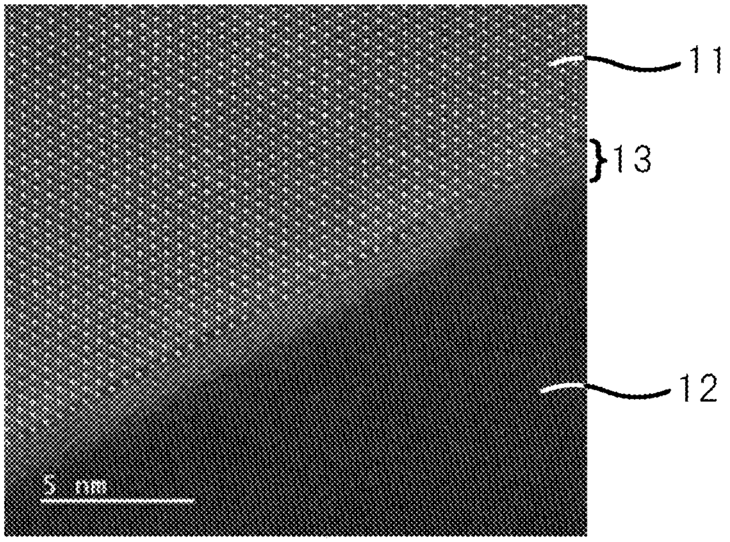
FIG. 2 is an HAADF image of another portion of a structure of the sintered magnet of Example 1 observed by STEM.

From this sintered body, a sample for observation was cut into thin sections using an FIB-SEM apparatus (Scios Dual Beam manufactured by FEI), and observation was performed using a STEM apparatus (JEM-ARM200F manufactured by JEOL Ltd.). The obtained HAADF (High-Angle Annular Dark Field) images are shown in FIG. 1 and FIG. 2. From FIG. 1, it can be confirmed that the intergranular grain boundary phase 13 is present in the grain boundary portion sandwiched between two main phase grains 11 and 12. The thickness of the intergranular grain boundary phase 13 at this time was about 0.7 nm, and the composition obtained by EDX analysis (energy dispersive X-ray fluorescence analysis) was $Sm_{61.2}Fe_{bal.}V_{7.1}Al_{1.3}Si_{1.1}$. In FIG. 2 in which another portion of the same sintered body was observed, the intergranular grain boundary phase 13 had a thickness of about 1.4 nm, and the composition was $Sm_{31.9}Fe_{bal.}V_{9.5}Al_{2.7}Si_{0.6}$. The results are shown in Tables 1 to 3, and 5.

Comparative Example 1

Figure 3:
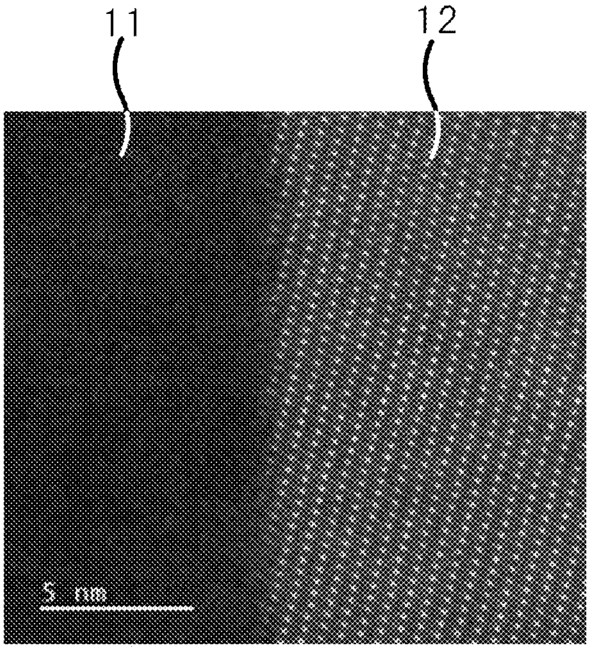
FIG. 3 is an HAADF image of a structure of the sintered magnet of Comparative Example 1 observed by STEM.

Sm metal, electrolytic iron, and Ti metal were used to control a composition, and a cast alloy was prepared in a high-frequency induction furnace in the same manner as in Example 1, and further subjected to heat treatment at 900° C. for 50 hours. The structure of the obtained alloy was observed with a laser microscope, and it was confirmed from the observed image that the average crystal grain size of the main phase was 5 μm or more. In the same manner as in Example 1, pulverization and compacting in a magnetic field were performed, followed by sintering in an Ar gas atmosphere at 1175° C. for 3 hours, and cooling to room temperature at a cooling rate of 13° C./min to obtain a sintered body of Comparative Example 1. The composition value of the sintered body analyzed by the ICP method was $Sm_{9.7}Fe_{bal.}Ti_{8.1}$. It was also confirmed by X-ray diffraction measurement that the main phase of Comparative Example 1 was a $ThMn_{12}$ type crystal. When the formed phase was examined by EPMA, an $R(Fe,Co)_2$ phase existed, but an R-rich phase was not formed, and a fine TiC phase was precipitated. When the magnetic properties were measured with a B—H tracer, this Comparative Example 1 showed only a low coercive force of 0.1 kOe at room temperature. The HAADF image obtained in Comparative Example 1 is shown in FIG. 3. At the boundary between the two main phase grains 11 and 12, an intergranular boundary phase as seen in Example 1 was not formed. The results are shown in Tables 1 to 3.

Examples 2 to 8

In the same manner as in Example 1, cast alloys were prepared by high-frequency melting while controlling compositions. In order to eliminate the primary α-Fe, the alloys were subjected to heat treatment at 850 to 1100° C. for 10 to 50 hours. The structures of the obtained alloys were observed with a laser microscope, and it was confirmed from the observed images that the average crystal grain size of the main phase was 1 μm or more in all cases. After hydrogen storage treatment was performed on the alloys, the alloys were subjected to dehydrogenation treatment by heating at 450° C. in a vacuum to obtain coarse powders, and the coarse powders were pulverized by a jet mill in a nitrogen stream to obtain fine powders having an average grain size of 2 to 4 μm. Further, the fine powder was filled in a die of a compacting device in an inert gas atmosphere and compacted in a magnetic field to obtain a powder compact. The powder compact was sintered in an Ar gas atmosphere, cooled to room temperature, and further subjected to aging heat treatment to obtain a sintered body sample. Table 1 shows the composition of each sample analyzed by the ICP method, the crystal structure of the main phase confirmed by X-ray diffraction, and the average crystal grain size of the main phase of the sintered body. Table 2 shows the sintering treatment conditions, the cooling rate after sintering, the aging treatment conditions, $B_r$ and $H_{cJ}$ measured at room temperature, and the temperature coefficient ß of $H_{cJ}$ in each example. In Example 8, a two step sintering method was applied in which the temperature was raised to a first sintering temperature, then immediately lowered to a second sintering temperature, and held for a predetermined time. Table 3 shows the composition of each phase analyzed by EPMA and the phase ratio. In each of the samples of Examples 2 to 8, the R-rich phase and the $R(Fe,Co)_2$ phase were formed in the structure, and the samples showed the coercive force of 5 kOe or more at room temperature and the temperature coefficient ß of −0.5%/K or more. In addition, when these sintered body samples were subjected to STEM observation in the same manner as in Example 1, it was confirmed that an intergranular grain boundary phase was present in a grain boundary portion sandwiched between two main phase grains in each of Examples. Table 5 shows the measured compositions and thicknesses of the intergranular grain boundary phases.

Comparative Examples 2 to 6

Sintered body samples of Comparative Examples 2 to 5 were prepared in the same manner as in Example 2 except that the compositions were controlled to those shown in Table 1. The results are shown in Tables 1, 2 and 4. In Comparative Example 2, the total amount of R was less than 7 at %, sufficient sintering could not be performed, and a large amount of α-Fe phase was formed in the sintered body. In Comparative Example 3, the total amount of R exceeded 15 at %, and the volume fraction of the main phase was less than 80%. In Comparative Example 4, the total amount of the M element exceeded 20 at %, the R-rich phase was not observed, and an RFeSi phase of PbClF type crystal was formed. In Comparative Example 5, an $RCu_2$ phase of $KHg_2$ type crystal was present at the grain boundary triple junctions, but the total amount of the M element exceeded 20 at %, and the R-rich phase was not observed. In Comparative Example 6, the total amount of M was less than 4 at %, $ThMn_{12}$ crystal was not observed in the structure, and a main phase of a $Th_2Zn_{17}$ type crystal was formed.

Comparative Example 7

Sm metal, electrolytic iron, Ti metal, and V metal were used to control a composition, and the molten raw material was cooled on a Cu roll rotating at a peripheral speed of 20 m/sec to prepare a quenched thin strip raw alloy. The thickness of the thin strip was 10 to 50 μm. The structure of the obtained alloy was observed with a laser microscope, and it was confirmed from the observed image that the average crystal grain size was too fine to be measured, but was at least smaller than 1 μm. After this alloy thin strip was pulverized by a ball mill, a powder having a size of 300 μm or less was selected by a sieve, and hot-pressed in an Ar atmosphere at 750° C. The average crystal grain size of the main phase grains was as fine as about 0.2 to 0.3 μm, and the compositions of the main phase and the grain boundary phase could not be identified by EPMA. In addition, since the axis of easy magnetization of the main phase was not aligned, only low $B_r$ was obtained. The results are shown in Tables 1, 2, and 4.

Example 9

Nd metal, Y metal, electrolytic iron, pure silicon, and Hf metal were used to control a composition, the composition was melted in an Ar gas atmosphere using a high-frequency induction furnace, and strip-cast on a water-cooled Cu roll to prepare a quenched thin strip alloy having a thickness of about 0.2 to 0.4 mm and a composition of Nd 7.5 at %, Y 1.0 at %, Si 13.0 at %, Hf 1.0 at %, with the balance being Fe. The average crystal grain size in the minor axis direction of the alloy obtained from an image observed with a laser microscope was 2.5 lim. The alloy was subjected to hydrogen storage treatment at room temperature and then to dehydrogenation treatment by heating at 400° C. in a vacuum to obtain a coarse powder (referred to as 9A powder). On the other hand, using Sm metal, Ga metal, Cu metal and Co metal as raw materials, an alloy ingot having a composition of Sm 40 at %, Ga 10 at %, Cu 5 at % and the balance Co was prepared by using a high-frequency induction furnace, and was made into a coarse powder by mechanical pulverization (9B powder). The 9A powder and the 9B powder were mixed at a weight ratio of 95:5 and then pulverized by a jet mill in a nitrogen stream to prepare a fine powder having an average grain size of 1.8 μm.

This mixed powder was compacted in a magnetic field in the same manner as in Example 1, sintered in an Ar gas atmosphere at 1200° C. for 3 hours, cooled to room temperature at a cooling rate of 12° C./min, and further subjected to heat treatment in an Ar gas atmosphere at 650° C. for 1 hour to obtain a sintered body of Example 9. The composition value of the sintered body sample was $Sm_{1.8}Nd_{7.2}Y_{1.0}Fe_{bal.}Co_{1.0}Si_{12.8}Ga_{0.6}Cu_{0.4}Hf_{1.0}$. It was also confirmed by X-ray diffraction measurement that the main phase of this sintered body was a $ThMn_{12}$ type crystal.

The composition of the main phase measured by EPMA was $Nd_{6.4}Y_{1.1}Fe_{bal.}Co_{1.0}Si_{12.7}Ga_{0.5}Cu_{0.1}Hf_{1.1}$ in the central portion of the grain, which does not contain Sm, but was $Sm_{3.5}Nd_{3.0}Y_{1.0}Fe_{bal.}Co_{1.0}Si_{13.0}Ga_{0.4}Cu_{0.1}Hf_{0.9}$ in the outer shell portion of the grain, and it was confirmed that the Sm/R ratio in the inner portion of the grain was lower than the Sm/R ratio in the surface portion. In addition, the structure of the sintered body was observed and the composition of each phase was analyzed by EPMA, and it was confirmed that an R-rich phase and an $R(Fe,Co)_2$ phase were present in an amount of 1% by volume or more in a grain boundary portion. Further, an $RCu_2$ phase was slightly observed. No $R_2(Fe,Co,M)_{17}$ phase, $R_3(Fe,Co,M)_{29}$ phase or α-Fe phase was observed. Since a phase such as an oxide is also present, the total phase ratio is less than 100%.

The composition analysis values of the R-rich phase, the $R(Fe,Co)_2$ phase and the $RCu_2$ phase were $Sm_{26.8}Nd_{31.7}Y_{0.1}Fe_{bal.}Si_{36.2}Ga_{5.2}$, $Sm_{17.2}Nd_{17.4}Y_{0.2}Fe_{bal.}Co_{0.4}Si_{0.3}Hf_{0.1}$ and $Sm_{15.9}Nd_{18.6}Fe_{bal.}Cu_{65.2}$, respectively. From this, it was confirmed that the Sm/R ratio in the inner portion of the grain was lower than the Sm/R ratios of the R-rich phase and the $R(Fe,Co)_2$ phase. The average crystal grain size of the main phase was 8.6 μm. The coercive force of this sintered body was 5.6 kOe at room temperature, and the temperature coefficient ß of the coercive force was −0.45%/K. Based on the analysis value of the $R(Fe,Co)_2$ phase, an alloy having the same composition was prepared and had a Curie temperature $T_c$ of 318° C.

STEM observation was performed on Example 9 in the same manner as in Example 1, and it was confirmed that an intergranular grain boundary phase was present in a grain boundary portion sandwiched between two main phase grains. The measured composition of the intergranular grain boundary phase was $Sm_{21.7}Nd_{24.5}Fe_{bal.}Co_{0.5}Si_{12.8}Ga_{2.6}Cu_{8.0}$, and the thickness was 35 nm.

Example 10

Ce metal, La metal, electrolytic iron, Co metal, pure silicon, and Mo metal were used to control a composition, the composition was melted in an Ar gas atmosphere using a high-frequency induction furnace, and then strip-cast on a water-cooled Cu roll to prepare an alloy thin strip having a thickness of about 0.2 to 0.4 mm. The average grain boundary phase interval of this alloy was calculated to be 4.1 μm. The alloy was subjected to the same hydrogen storage treatment and dehydrogenation treatment as in Example 9 to obtain a coarse powder, which was further pulverized with a jet mill in a nitrogen stream to prepare a fine powder having an average grain size of 2.9 μm. Next, the fine powder was press-formed while being oriented in a magnetic field, sintered in a vacuum at 950° C. for 1.5 hours, cooled to room temperature at a cooling rate of 11° C./min, and taken out to obtain a sintered body. This sintered body was placed in a vacuum heat treatment furnace together with Sm metal, subjected to heat treatment at 780° C. for 8 hours, once taken out from the furnace, and further subjected to aging treatment at 520° C. for 2 hours to obtain Example 10.

As a result of ICP analysis of the sintered body sample of Example 10, the composition was $Sm_{2.4}Ce_{7.7}La_{1.1}Fe_{bal.}Co_{0.6}Si_{12.6}Mo_{0.9}$. From the X-ray diffraction measurement of a powder obtained by pulverizing a part of the sample, it was confirmed that the crystal structure of the main phase was $ThMn_{12}$ type. In addition, the structure of the sintered body was observed and the composition of each phase was analyzed by EPMA, and it was confirmed that an R-rich phase and an $R(Fe,Co)_2$ phase were present in an amount of 1% by volume or more in a grain boundary portion. No $R_2(Fe,Co,M)_{17}$ phase, $R_3(Fe,Co,M)_{29}$ phase or α-Fe phase was observed. Since a phase such as an oxide is also present, the total phase ratio is less than 100%.

The composition analysis values of the central portion and the outer shell portion of the main phase grains by EPMA were $Ce_{7.3}La_{0.1}Fe_{bal.}Co_{0.5}Si_{13.5}Mo_{1.0}$ and $Sm_{3.2}Ce_{4.2}La_{0.3}Fe_{bal.}Co_{0.5}Si_{13.5}Mo_{1.0}$, respectively, and it was confirmed that the Sm/R ratio in the inner portion of the grain was lower than the Sm/R ratio of the surface portion. The composition analysis values of the R-rich phase and the $R(Fe,Co)_2$ phase were $Sm_{31.1}Ce_{19.6}La_{23.2}Fe_{bal.}Co_{2.7}Si_{0.6}Mo_{0.2}$ and $Sm_{15.0}Ce_{18.9}La_{0.5}Fe_{bal.}Co_{0.2}Si_{0.7}Mo_{0.2}$, respectively. While Sm was not detected in the inner portion of the main phase grains, the R-rich phase and the $R(Fe,Co)_2$ phase present at the grain boundary portion contained Sm and it was confirmed that the Sm/R ratio was high.

Based on the analysis values of the $R(Fe,Co)_2$ phase, an alloy having the same composition was prepared by arc melting, subjected to homogenization treatment at 800° C. for 20 hours, and then subjected to magnetization-temperature measurement with VSM. The Curie temperature $T_c$ was 140° C. The average crystal grain size of the main phase calculated from the results of etching and observation of the sintered body of Example 9 was 12.3 μm. Further, when the magnetic properties were measured with a B—H tracer, the coercive force $H_{cJ}$ at room temperature was 6.3 kOe. Furthermore, the temperature coefficient ß of $H_{cJ}$ was −0.48%/K.

STEM observation was performed on Example 10 in the same manner as in Example 1, and it was confirmed that an intergranular grain boundary phase was present in a grain boundary portion sandwiched between two main phase grains. The measured composition of the intergranular grain boundary phase was $Sm_{21.2}Ce_{15.5}La_{25.9}Fe_{bal.}Co_{1.0}Si_{0.6}$, and the thickness was 92 nm.

Comparative Example 8

A sintered body of Comparative Example 8 was prepared by the same preparation method as that of the sintered body of Example 10 except that an aging treatment was performed at 520° C. for 2 hours without performing the step of simultaneously performing the heat treatment with the Sm metal.

The composition of the sintered body of Comparative Example 8 was $Ce_{8.3}La_{1.3}Fe_{bal.}Co_{0.6}Si_{13.0}Mo_{0.9}$, without containing Sm, and the composition analysis value of the main phase grain was $Ce_{7.5}La_{0.3}Fe_{bal.}Co_{0.6}Si_{13.1}Mo_{0.9}$. No $R(Fe,Co)_2$ phase was present in the grain boundary portion, and two types of R-rich phases having compositions of $Ce_{33.1}La_{29.6}Fe_{bal.}Si_{37.3}$ and $Ce_{23.3}La_{54.3}Fe_{bal.}Co_{0.8}Si_{0.6}Mo_{0.1}$ were observed. The coercive force $H_{cJ}$ at room temperature of Comparative Example 8 was 0.1 kOe. The results are shown in Tables 6 to 9.

TABLE 1

| | ICP Composition Analysis Value of Sintered Body (at %) | Crystal Structure of Main Phase | Average Crystal Grain Size (μm) |
|---|---|---|---|
| Example 1 | $Sm_{10.2}Fe_{bal.}V_{14.9}Al_{0.5}Si_{0.2}$ | $ThMn_{12}$ | 9.9 |
| Comparative Example 1 | $Sm_{9.7}Fe_{bal.}Ti_{8.1}$ | $ThMn_{12}$ | 8.1 |
| Example 2 | $Sm_{8.3}Ce_{3.8}Fe_{bal.}Co_{3.4}Si_{10.6}Ti_{2.3}$ | $ThMn_{12}$ | 9.6 |
| Example 3 | $Sm_{7.3}Nd_{3.7}Fe_{bal.}Co_{8.0}Cr_{13.1}Nb_{1.0}$ | $ThMn_{12}$ | 8.7 |
| Example 4 | $Sm_{7.0}Y_{2.9}Fe_{bal.}Si_{8.8}Cr_{4.4}Hf_{1.2}$ | $ThMn_{12}$ | 5.9 |
| Example 5 | $Sm_{7.5}Zr_{2.8}Fe_{bal.}Co_{9.4}V_{11.7}Ni_{2.0}W_{0.4}$ | $ThMn_{12}$ | 6.6 |
| Example 6 | $Ce_{6.9}Sm_{3.8}Fe_{bal.}V_{11.1}Si_{0.9}$ | $ThMn_{12}$ | 10.8 |
| Example 7 | $Pr_{7.5}Sm_{3.7}Fe_{bal.}Co_{2.6}Cr_{11.4}Cu_{0.1}Ta_{1.1}$ | $ThMn_{12}$ | 8.6 |
| Example 8 | $Sm_{7.9}Dy_{3.0}Fe_{bal.}Cr_{12.8}Mn_{1.0}Ga_{0.8}Mo_{0.6}$ | $ThMn_{12}$ | 7.9 |
| Comparative Example 2 | $Sm_{5.0}Pr_{1.5}Fe_{bal.}V_{11.3}Si_{1.9}$ | $ThMn_{12}$ | 5.1 |
| Comparative Example 3 | $Nd_{20.8}Sm_{3.4}Fe_{bal.}Co_{20.6}Cr_{9.6}Ga_{2.4}Mo_{0.8}$ | $ThMn_{12}$ | 12.1 |
| Comparative Example 4 | $Y_{11.4}Sm_{2.4}Fe_{bal.}Si_{19.3}Mn_{2.0}Ta_{3.6}$ | $ThMn_{12}$ | 7.9 |
| Comparative Example 5 | $Sm_{9.5}Ce_{2.1}Fe_{bal.}Co_{1.8}V_{14.4}Mn_{4.6}Cu_{3.6}$ | $ThMn_{12}$ | 8.8 |
| Comparative Example 6 | $Pr_{10.1}Sm_{2.8}Fe_{bal.}Co_{3.3}Cr_{1.1}Hf_{1.8}$ | $Th_2Zn_{17}$ | 8.3 |
| Comparative Example 7 | $Sm_{9.3}Fe_{bal.}V_{4.2}Ti_{5.1}$ | $ThMn_{12}$ | <1 μm |

TABLE 2

| | Sintering Condition | Cooling Rate (° C./min) | Aging Condition | $B_r$ (kG) | $H_{cJ}$ (kOe) | β (%/K) |
|---|---|---|---|---|---|---|
| Example 1 | 1140° C., 3 h | 13 | No aging | 8.2 | 8.5 | −0.46 |
| Comparative Example 1 | 1175° C., 3 h | 13 | No aging | 1.8 | 0.2 | — |
| Example 2 | 1100° C., 2 h | 12 | 470° C., 3 h | 8.9 | 8.5 | −0.45 |
| Example 3 | 1150° C., 3 h | 15 | 600° C., 2 h | 8.4 | 5.5 | −0.47 |
| Example 4 | 1200° C., 4 h | 7 | No aging | 9.7 | 6.8 | −0.4 |
| Example 5 | 1150° C., 5 h | 15 | 680° C., 5 h | 10.5 | 5.8 | −0.42 |
| Example 6 | 1090° C., 3 h | 20 | 500° C., 2 h | 10.3 | 8.5 | −0.46 |
| Example 7 | 1110° C., 3 h | 30 | No aging | 9.4 | 5.3 | −0.43 |
| Example 8 | 1160° C./1040° C., 10 h | 25 | 600° C., 2 h | 6.3 | 5.8 | −0.39 |
| Comparative Example 2 | 1150° C., 2 h | 10 | 700° C., 8 h | 0.6 | 0.2 | — |
| Comparative Example 3 | 1160° C., 5 h | 30 | No aging | 4.7 | 5.4 | — |
| Comparative Example 4 | 1200° C., 3 h | 12 | No aging | 2.5 | 0.6 | — |
| Comparative Example 5 | 1120° C., 3 h | 15 | 620° C., 3 h | 4.7 | 0.4 | — |
| Comparative Example 6 | 1140° C., 3 h | 10 | No aging | 5.4 | 0.2 | — |
| Comparative Example 7 | — | — | — | 4.1 | 6.7 | — |

TABLE 3

| | Constituting Phase | EPMA Composition Analysis Value of Each Phase (at %) | Phase Ratio (% by volume) |
|---|---|---|---|
| Example 1 | $R(FeCoM)_{12}$ phase | $Sm_{7.6}Fe_{bal.}V_{15.2}Al_{0.5}Si_{0.2}$ | 92.2 |
| | R-rich phase | $Sm_{59.6}Fe_{bal.}V_{1.3}Al_{0.0}Si_{0.2}$ | 2.4 |
| | $R(FeCo)_2$ phase | $Sm_{32.5}Fe_{bal.}V_{4.4}Al_{1.4}Si_{0.3}$ | 1.7 |
| Comparative Example 1 | $R(FeCoM)_{12}$ phase | $Sm_{7.8}Fe_{bal.}Ti_{8.0}$ | 92.8 |
| | R-rich phase | — | — |
| | $R(FeCo)_2$ phase | $Sm_{33.8}Fe_{bal.}Ti_{1.6}$ | 1.8 |
| | $(FeCo)_2M$ phase | $Fe_{bal.}Ti_{28.3}$ | 1.4 |
| Example 2 | $R(FeCoM)_{12}$ phase | $Sm_{5.8}Ce_{2.1}Fe_{bal.}Co_{3.2}Si_{11.3}Ti_{2.3}$ | 87.2 |
| | R-rich phase | $Sm_{22.8}Ce_{52.1}Fe_{bal.}Co_{14.8}Si_{3.7}Ti_{0.7}$ | 4.9 |
| | $R(FeCo)_2$ phase | $Sm_{10.7}Ce_{21.4}Fe_{bal.}Co_{1.3}Si_{4.7}Ti_{1.0}$ | 2.9 |
| | $(FeCo)_2M$ phase | $Fe_{bal.}Co_{2.7}Ti_{28.1}$ | 0.3 |

TABLE 3-continued

| | Constituting Phase | EPMA Composition Analysis Value of Each Phase (at %) | Phase Ratio (% by volume) |
|---|---|---|---|
| Example 3 | $R(FeCoM)_{12}$ phase | $Sm_{4.8}Nd_{3.2}Fe_{bal.}Co_{8.1}Cr_{13.7}Nb_{1.0}$ | 91.4 |
| | R-rich phase | $Sm_{30.2}Nd_{36.5}Fe_{bal.}Co_{23.2}Cr_{1.2}Nb_{0.1}$ | 2.1 |
| | $R(FeCo)_2$ phase | $Sm_{20.7}Nd_{11.5}Fe_{bal.}Co_{1.3}Cr_{2.2}Nb_{0.2}$ | 1.8 |
| Example 4 | $R(FeCoM)_{12}$ phase | $Sm_{4.7}Y_{3.0}Fe_{bal.}Si_{8.6}Cr_{4.6}Hf_{1.1}$ | 92.7 |
| | R-rich phase | $Sm_{88.7}Y_{1.3}Fe_{bal.}Si_{0.7}Cr_{0.4}Hf_{0.1}$ | 1.3 |
| | $R(FeCo)_2$ phase | $Sm_{28.5}Y_{1.7}Fe_{bal.}Si_{1.3}Cr_{0.7}Hf_{0.2}$ | 1.4 |
| | $(FeCo)_2M$ phase | $Fe_{bal.}Si_{0.4}Cr_{0.3}Hf_{27.9}$ | 0.8 |
| Example 5 | $R(FeCoM)_{12}$ phase | $Sm_{5.1}Zr_{2.9}Fe_{bal.}Co_{9.4}V_{12.1}Ni_{2.1}W_{0.4}$ | 92.8 |
| | R-rich phase | $Sm_{63.9}Fe_{bal.}Co_{24.1}V_{1.1}Ni_{0.2}W_{0.0}$ | 2.4 |
| | $R(FeCo)_2$ phase | $Sm_{28.6}Zr_{0.2}Fe_{bal.}Co_{1.8}V_{2.3}Ni_{0.4}W_{0.1}$ | 1.2 |
| Example 6 | $R(FeCoM)_{12}$ phase | $Ce_{3.9}Sm_{3.6}Fe_{bal.}V_{11.6}Si_{0.8}$ | 90.6 |
| | R-rich phase | $Ce_{55.8}Sm_{12.4}Fe_{bal.}V_{1.6}Si_{9.4}$ | 2.4 |
| | $R(FeCo)_2$ phase | $Ce_{19.1}Sm_{11.0}Fe_{bal.}V_{4.5}Si_{0.3}$ | 2.4 |
| Example 7 | $R(FeCoM)_{12}$ phase | $Pr_{4.6}Sm_{3.4}Fe_{bal.}Co_{2.6}Cr_{12.1}Cu_{0.1}Ta_{1.2}$ | 90.5 |
| | R-rich phase | $Pr_{52.9}Sm_{18.9}Fe_{bal.}Co_{11.2}Cr_{1.1}Cu_{5.7}Ta_{0.1}$ | 1.4 |
| | $R(FeCo)_2$ phase | $Pr_{19.1}Sm_{10.7}Fe_{bal.}Co_{0.5}Cr_{2.3}Cu_{0.0}Ta_{0.2}$ | 3.4 |
| | $(FeCo)_2M$ phasc | $Fe_{bal.}Co_{2.2}$ | 0.3 |
| Example 8 | $R(FeCoM)_{12}$ phase | $Sm_{5.8}Dy_{2.1}Fe_{bal.}Cr_{13.3}Mn_{1.0}Ga_{0.8}Mo_{0.6}$ | 91.8 |
| | R-rich phase | $Sm_{18.9}Dy_{69.1}Fe_{bal.}Cr_{1.2}Mn_{0.1}Ga_{0.1}Mo_{0.1}$ | 2 |
| | $R(FeCo)_2$ phase | $Sm_{0.6}Dy_{29.5}Fe_{bal.}Cr_{2.5}Mn_{0.2}Ga_{0.1}Mo_{0.1}$ | 1.5 |

TABLE 4

| | Constituting Phase | EPMA Composition Analysis Value of Each Phase (at %) | Phase Ratio (% by volume) |
|---|---|---|---|
| Comparative Example 2 | $R(FeCoM)_{12}$ phase | $Sm_{5.4}Pr_{1.9}Fe_{bal.}V_{14.4}Si_{2.4}$ | 73.5 |
| | R-rich phase | — | — |
| | $R(FeCo)_2$ phase | $Sm_{21.1}Pr_{8.7}Fe_{bal.}V_{2.7}Si_{0.4}$ | 1.9 |
| | α-Fe phase | $Fe_{bal.}V_{3.4}Si_{0.6}$ | 22.8 |
| Comparative Example 3 | $R(FeCoM)_{12}$ phase | $Nd_{9.8}Sm_{0.5}Fe_{bal.}Co_{24.6}Cr_{14.2}Ga_{2.4}Mo_{1.2}$ | 54.5 |
| | R-rich phase | $Nd_{57.0}Sm_{1.1}Fe_{bal.}Co_{24.9}Cr_{1.2}Ga_{4.6}Mo_{0.1}$ | 23.1 |
| | $R(FeCo)_2$ phase | $Nd_{8.0}Sm_{18.5}Fe_{bal.}Co_{4.6}Cr_{2.7}Ca_{0.4}Mo_{0.2}$ | 15 |
| Comparative Example 4 | $R(FeCoM)_{12}$ phase | $Y_{5.9}Sm_{0.9}Fe_{bal.}Si_{16.1}Mn_{2.5}Ta_{4.6}$ | 70.8 |
| | R-rich phase | — | — |
| | $R(FeCo)_2$ phase | $Y_{0.5}Sm_{29.3}Fe_{bal.}Si_{3.0}Mn_{0.5}Ta_{0.9}$ | 5.6 |
| | RFeSi phase | $Y_{25.2}Sm_{1.9}Fe_{bal.}Si_{37.7}Mn_{0.6}Ta_{1.1}$ | 20.4 |
| Comparative Example 5 | $R(FeCoM)_{12}$ phase | $Sm_{5.6}Ce_{1.8}Fe_{bal.}Co_{2.0}V_{16.1}Mn_{5.1}Cu_{0.1}$ | 84.2 |
| | R-rich phase | — | — |
| | $R(FeCo)_2$ phase | $Sm_{14.8}Ce_{15.1}Fe_{bal.}Co_{0.4}V_{3.0}Mn_{1.0}Cu_{0.0}$ | 3.8 |
| | $RCu_2$ phase | $Sm_{33.7}Fe_{bal.}Co_{0.5}V_{0.2}Cu_{64.3}$ | 7.3 |
| Comparative Example 6 | $R(FeCoM)_{12}$ phase | $Pr_{5.8}Sm_{1.8}Fe_{bal.}Co_{3.2}Cr_{3.2}Hf_{5.5}$ | 0 |
| | R-rich phase | — | — |
| | $R(FeCo)_2$ phase | $Pr_{9.6}Sm_{20.1}Fe_{bal.}Co_{6.0}Cr_{0.6}Hf_{1.0}$ | 2.4 |
| | $R_2Fe_{17}$ phase | $Pr_{8.1}Sm_{2.5}Fe_{bal.}Co_{3.3}Cr_{1.1}Hf_{1.9}$ | 93.2 |
| Comparative Example 7 | Composition analysis by EPMA is impossible. | | |

TABLE 5

| | Composition Analysis Value of Intergranular Grain Boundary Phase (at %) | Thickness (nm) |
|---|---|---|
| Example 1 | $Sm_{61.2}Fe_{bal.}V_{7.1}Al_{1.3}Si_{1.1}$ | 0.7 |
| | $Sm_{31.9}Fe_{bal.}V_{9.5}Al_{2.7}Si_{0.6}$ | 1.4 |
| Example 2 | $Sm_{17.0}Ce_{37.3}Fe_{bal.}Co_{25.1}Si_{12.5}Ti_{2.5}$ | 27 |
| Example 3 | $Sm_{24.0}Nd_{21.7}Fe_{bal.}Co_{10.6}Cr_{5.2}Nb_{0.4}$ | 13 |
| Example 4 | $Sm_{45.7}Y_{1.4}Fe_{bal.}Si_{3.5}Cr_{1.9}Hf_{0.4}$ | 3.1 |
| Example 5 | $Sm_{42.7}Zr_{0.1}Fe_{bal.}Co_{14.9}V_{4.9}Ni_{0.8}W_{0.2}$ | 120 |
| Example 6 | $Ce_{27.6}Sm_{9.7}Fe_{bal.}V_{10.6}Si_{11.6}$ | 16 |
| Example 7 | $Pr_{26.4}Sm_{12.4}Fe_{bal.}Co_{2.5}Cr_{6.0}Cu_{3.7}Ta_{0.6}$ | 70 |
| Example 8 | $Sm_{5.3}Dy_{29.4}Fe_{bal.}Cr_{11.1}Mn_{0.8}Ga_{0.7}Mo_{0.5}$ | 230 |

TABLE 6

| | ICP Composition Analysis Value of Sintered Body (at %) | Crystal Structure of Main Phase | Average Crystal Grain Size (μm) |
|---|---|---|---|
| Example 9 | $Sm_{1.8}Nd_{7.2}Y_{1.0}Fe_{bal.}Co_{1.0}Si_{12.8}Ga_{0.6}Cu_{0.4}Hf_{1.0}$ | $ThMn_{12}$ | 8.6 |
| Example 10 | $Sm_{2.4}Ce_{7.7}La_{1.1}Fe_{bal.}Co_{0.6}Si_{12.6}Mo_{0.9}$ | $ThMn_{12}$ | 12.3 |
| Comparative Example 8 | $Ce_{8.3}La_{1.3}Fe_{bal.}Co_{0.6}Si_{13.0}Mo_{0.9}$ | $ThMn_{12}$ | 10.1 |

TABLE 7

| | Sintering Condition and Diffusion Condition | Cooling Rate (° C./min) | Aging Condition | $B_r$ (kG) | $H_{cJ}$ (kOe) | β (%/K) |
|---|---|---|---|---|---|---|
| Example 9 | (Sintering) 1200° C., 3 h | 12 | 650° C., 1 h | 10.5 | 5.6 | −0.45 |
| Example 10 | (Sintering) 950° C., 1.5 h | 11 | No aging | 8.1 | 6.3 | −0.48 |
| | (Diffusion) 780° C., 8 h | 5 | 520° C., 2 h | | | |
| Comparative Example 8 | (Sintering) 950° C., 1.5 h | 11 | 520° C., 2 h | 0.6 | 0.1 | — |

TABLE 8

| | Constituting Phase | EPMA Composition Analysis Value of Each Phase (at %) | Phase Ratio (% by volume) |
|---|---|---|---|
| Example 9 | $R(FeCoM)_{12}$ phase | (Central) $Nd_{6.4}Y_{1.1}Fe_{bal.}Co_{1.0}Si_{12.7}Ga_{0.5}Cu_{0.1}Hf_{1.1}$ (Outer shell) $Sm_{3.5}Nd_{3.0}Y_{1.0}Fe_{bal.}Co_{1.0}Si_{13.0}Ga_{0.4}Cu_{0.1}Hf_{0.9}$ | 91.2 |
| | R-rich phase | $Sm_{26.8}Nd_{31.7}Y_{0.1}Fe_{bal.}Si_{36.2}Ga_{5.2}$ | 3.7 |
| | $R(FeCo)_2$ phase | $Sm_{17.2}Nd_{17.4}Y_{0.2}Fe_{bal.}Co_{0.4}Si_{0.3}Hf_{0.1}$ | 2.1 |
| | $RCu_2$ phase | $Sm_{15.9}Nd_{18.6}Fe_{bal.}Cu_{65.2}$ | 0.7 |
| Example 10 | $R(FeCoM)_{12}$ phase | (Central) $Ce_{7.3}La_{0.1}Fe_{bal.}Co_{0.5}Si_{13.5}Mo_{1.0}$ (Outer shell) $Sm_{3.2}Ce_{4.2}La_{0.3}Fe_{bal.}Co_{0.5}Si_{13.5}Mo_{1.0}$ | 88.2 |
| | R-rich phase | $Sm_{31.1}Ge_{19.6}La_{23.2}Fe_{bal.}Co_{2.7}Si_{0.6}Mo_{0.2}$ | 8.6 |
| | $R(FeCo)_2$ phase | $Sm_{15.0}Ce_{18.9}La_{0.5}Fe_{bal.}Co_{0.2}Si_{0.7}Mo_{0.2}$ | 2.3 |
| Comparative Example 8 | $R(FeCoM)_{12}$ phase | $Ce_{7.5}La_{0.3}Fe_{bal.}Co_{0.6}Si_{13.1}Mo_{0.9}$ | 95.2 |
| | R-rich phase | $Ce_{33.1}La_{29.6}Fe_{bal.}Si_{37.3}Mo_{0.0}$ | 0.9 |
| | | $Ce_{23.3}La_{54.3}Fe_{bal.}Co_{0.8}Si_{0.6}Mo_{0.1}$ | 2.9 |
| | $R(FeCo)_2$ phase | — | — |

TABLE 9

| | Composition Analysis Value of Intergranular Grain Boundary Phase (at %) | Thickness (nm) |
|---|---|---|
| Example 9 | $Sm_{21.7}Nd_{24.5}Fe_{bal.}Co_{0.5}Si_{12.8}Ga_{2.6}Cu_{8.0}$ | 35 |
| Example 10 | $Sm_{21.2}Ce_{15.5}La_{25.9}Fe_{bal.}Co_{1.0}Si_{0.6}$ | 92 |

REFERENCE SIGNS LIST

11,12: Main phase grain

13: Intergranular grain boundary phase

The invention claimed is:

1. An anisotropic rare earth sintered magnet represented by the formula $(R_{1-a}Zr_a)_x(Fe_{1-b}Co_b)_{100-x-y}(M^1{}_{1-c}M^2{}_c)_y$ (wherein R is a combination of Sm and one or more elements selected from the group consisting of Sc, Y, La, Ce, Pr, Nd, Eu, Gd, Tb, Dy, Ho, Er, Tm, Yb, and Lu; $M^1$ is at least one element selected from the group consisting of V, Cr, Mn, Ni, Cu, Zn, Ga, Al, and Si; $M^2$ is at least one element selected from the group consisting of Ti, Nb, Mo, Hf, Ta, and W; x, y, a, b, and c each satisfy 7≤x≤15 at %, 4≤y≤20 at %, 0≤a≤0.2, 0≤b≤0.5, and 0≤c≤0.9), the magnet comprising 80% by volume or more of a main phase composed of a compound of a $ThMn_{12}$ type crystal and containing an R-rich phase and an $R(Fe,Co)_2$ phase in a grain boundary portion, the main phase having an average crystal grain size of 1 μm or more, an intergranular grain boundary phase being formed between adjacent main phase grains and a Sm/R ratio in an inner portion of the main phase grain being lower than Sm/R ratios of the R-rich phase and the $R(Fe,Co)_2$ phase.

2. The anisotropic rare earth sintered magnet according to claim 1, wherein the intergranular grain boundary phase contains R in an amount of 20 at % or more.

3. The anisotropic rare earth sintered magnet according to claim 1, wherein the intergranular grain boundary phase has a thickness of 0.5 nm or more.

4. The anisotropic rare earth sintered magnet according to claim 1, wherein the R-rich phase and an $R(Fe,Co)_2$ phase are contained in an amount of 1% by volume or more in total.

5. The anisotropic rare earth sintered magnet according to claim 1, wherein a Sm/R ratio in an inner portion of the main phase grain is lower than a Sm/R ratio in an outer shell portion of the main phase grain.

6. The anisotropic rare earth sintered magnet according to claim 1, wherein Sm is not contained in an inner portion of the main phase grain.

7. The anisotropic rare earth sintered magnet according to claim 1, wherein the magnet exhibits a coercive force of 5 kOe or more at room temperature, and a temperature coefficient β of the coercive force is −0.5%/K or more.

* * * * *